United States Patent [19]

Waltert

[11] Patent Number: 4,854,959

[45] Date of Patent: Aug. 8, 1989

[54] FEEDING APPARATUS FOR GLASS MELTING FURNACES

[75] Inventor: Erich Waltert, Erlenbach, Fed. Rep. of Germany

[73] Assignee: SORG GmbH & Co. KG, Lohr am Main, Fed. Rep. of Germany

[21] Appl. No.: 167,071

[22] Filed: Mar. 11, 1988

[30] Foreign Application Priority Data

Mar. 20, 1987 [DE] Fed. Rep. of Germany ....... 3709178

[51] Int. Cl.$^4$ ................................................ C03B 3/00
[52] U.S. Cl. ......................................... 65/335; 65/27; 432/242
[58] Field of Search ..................... 65/335, 27; 432/242; 414/166

[56] References Cited

U.S. PATENT DOCUMENTS

| | | | |
|---|---|---|---|
| 3,780,889 | 12/1973 | Frazier .............................. | 65/335 X |
| 3,868,031 | 2/1975 | Frazier et al. .................... | 65/335 X |
| 4,197,109 | 4/1980 | Frazier et al. ........................ | 65/335 |
| 4,545,717 | 10/1985 | Wittler et al. ....................... | 414/166 |

Primary Examiner—Robert L. Lindsay
Attorney, Agent, or Firm—Felfe & Lynch

[57] ABSTRACT

Disclosed is an apparatus for feeding and distributing charge material through a feeding opening onto the molten bath surface in a glass melting furnace. On a movable stand there are disposed a charge hopper, a charging device, a pusher with a pusher holder and pusher driver and a heat shield substantially covering the feed opening, in which at least one opening is disposed for the passage therethrough of the charging device and of the pusher holder. To maintain a suitable path of movement of the pusher with simultaneous improvement of the shielding action of the heat shield, the pusher holder is mounted on a horizontal linear guiding device on a horizontal platform and is displaceable with respect to the latter by a horizontal driver. The platform is mounted on the stand by means of a vertical guiding device and can be raised and lowered on the stand by a vertical driver. Thus it is possible to uncouple the driving movements and provide a better sealing of the places at which the pusher holder passes through the heat shield.

17 Claims, 8 Drawing Sheets

FEEDING APPARATUS FOR GLASS MELTING FURNACES

BACKGROUND OF THE INVENTION

The invention relates to a feeding apparatus for feeding and distributing charge material through a feeding opening onto the molten bath surface of a glass melting furnace, having a movable stand which has a charge hopper, a charging system, a pusher with pusher holder and pusher driver for the production of a pushing motion having horizontal and vertical components, and a heat shield substantially covering the feeding opening, in which at least one opening is disposed for the accommodation of the charging system and the pusher holder.

DE-OS No. 26 25 314 and DE-AS No. 29 44 349 have disclosed feeding apparatus for glass melting furnaces, which have no heat shield, but in which the pushers likewise execute a swinging movement.

In the feeding apparatus according to DE-OS No. 26 25 314, the "doghouse" is largely open at the top and above the opening or the surface of the melt there is disposed a two-substance charging apparatus for cullet and finely granular frit material, in which first the cullet is fed in by means of a chute and then the frit material is poured onto the cullet by means of a cellular wheel air lock. The free fall of the charge material raises large amounts of dust inside and out. Dust is a great hazard to the personnel and to the melting apparatus, so that heat exchangers have to be cleaned of dust deposits periodically--a task which takes days. For melting tanks with a U-shaped flame configuration this type of charging is unsuitable. In front of the doghouse there is disposed a tamping apparatus separate from the charging apparatus, by means of which the poured material is tamped into strips by a movement, consisting of horizontal and vertical components, of a pressing member with a stripping blade, forced partially below the surface of the molten glass, and pushed in strips toward the melting zone of the furnace. This, however, entails the disadvantage that the surface of the melt is raised each time. Such an oscillation of the melt surface is, however, a very undesirable manner of operation. The tamping apparatus has a stationary platform on which tracks are fastened for the longitudinal guidance of the arms holding the tamper. Since there is no heat shield, the problem of sealing off a furnace interior from the surroundings and of sealing off heat shield openings through which holding arms pass does not arise in this arrangement.

From DE-AS No. 29 44 349 it is known to shield the furnace interior and the interior of the doghouse from the feeding apparatus and the surroundings, not with a heat shield but with a kind of bipartite and very complicated coupling device. For the feeding, a sloping plate is provided which is of virtually the same width as the doghose and whose front end extending into the doghouse serves simultaneously as a pusher for the charge material. Such apparatus are also known as chute feeding machines. The pusher is moved along a parallelogram whose longest sides, however, are not parallel to the melt surface but approximately parallel to the feeding plate. The pusher can dip into the melt, therefore, only at the end of the stroke, so that no appreciable stirring action is performed in the melt. Furthermore, a chute feeding machine of this kind produces on the melt surface an undesirable, uninterrupted "carpet" of charge material. The sealing of the very wide feeding plate is, however, difficult and calls for heat-resistant woven parts of large area above the feeding plate, and likewise a heat-resistant, folding fabric apron below the feeding plate. To provide the necessary flexibility this apron has to be thin, but then it can be effective only against dust, but not against the escape of energy. The feeding plate and pusher component, however, has still another serious disadvantage in regard to the degrees of freedom of movement of the pusher: since the charge material is bulk material resting on the feeding plate under the bulk tower, any lifting of the feeding plate parallel to itself would involve a lifting of all of the bulk material. Consequently, by means of a pivoting frame the feeding plate performs a swinging movement with respect to the stationary supporting frame (platform), and it is expressly stated that the pivot axis of the said frame is to be virtually coincident with a line that lies in the area of a so-called sand seal at the bottom end of the discharge opening of the bulk tower. Therefore there is no parallel displacement of the plane of movement of the pusher.

In feeding apparatus of this kind it is important to place the charge material—a mixture as a rule—in a uniform and controllable stream onto the bath surface and distribute it thereon so that the charge material will come as quickly as possible into intimate interaction with the molten glass for the purpose of melting.

DE-GM No. 83 04 858 discloses a feeding apparatus of the kind described above, in which a heat shield is disposed between the pusher and the stand, by which the end of the charging device, a vibratory conveyor trough, extends into the glass melting furnace. More precisely, the end of the charging system enters into the so-called doghouse of the melting furnace. The heat shield serves in this case to solve the problem of reducing the action of radiant heat on the feeding apparatus, especially on its charging device, and at the same time of reducing heat losses as well as the escape of gas and dust from the furnace chamber above the molten glass surface. However, to prevent interference between the heat shield and the pusher holder, a sufficiently large opening has to be provided in the heat shield, which, however, impairs the action of the heat shield.

In the known system, a crank-type vibrating driver engaging the pusher holder sets the pusher into periodical movements in which the bottom edge of the pusher or pusher blade describes a shallow ellipsoid pattern of movement. The crank of the driver motor engages a rod which is fastened fixedly to the pusher holder in the vertical direction. The oscillating shaft of the pusher and pusher holder is mounted on the end of a rocker arm and consequently performs oscillating movements on an arc in which the center of these movements is in the front area of the stand, but not in the area of the opening in the heat shield, so that the latter opening must be of correspondingly large dimensions. On account of the complexity of the pusher movement, no reliably working sealing means can be provided at the point where the pusher passes through the heat shield, so that the effect of the heat shield is limited.

Mainly, however, in the known system the bottom edge of the pusher or pusher blade does not move precisely parallel to the bath surface on account of the above-described elliptical motion, so that the action of the pusher on the charge material floating on the melt surface is different according to the distance between the pusher and the end of the charging system. The charge material must, as it is known, be divided on the melt surface, by the action of the pusher, into individual "pads" of material pushing or pushed on the surface of the melt, so that the molten glass already present will act with as little hindrance as possible on all parts of the charge material.

SUMMARY OF THE INVENTION

It is therefore the aim of the invention to improve a feeding apparatus of the kind described above so that the pusher will be guided on a more suitable path of movement relative to the bath surface, and that at the same time the shielding action of the heat shield can be improved.

The solution of the stated problem is accomplished according to the invention, in the feeding apparatus described above, in that the pusher holder is mounted by means of a linear guiding system that is always aligned horizontally, and is displaceable on a movable, horizontal platform, and can be displaced relative to the latter by a horizontal driver, and that the platform is mounted for movement parallel to itself on the stand, and can be raised and lowered by a vertical driver.

The "platform" referred to does not need to be in the form of a solid plate; the term is rather to be understood in the sense of a "platform of reference" which determines the position of the pusher holder and of the driver connected therewith. In the simplest case the said platform can consist of a frame or frame members on which the drive means pertaining to the pusher are mounted.

By the measures taken according to the invention, a complete decoupling of the horizontal and vertical components of movement is achieved, and an arbitrarily controllable interplay of the horizontal and vertical components of movement can be achieved by the appropriate controlling of the individual drivers. This control can be achieved, for example by a programmable microprocessor.

By the solution according to the invention the pusher can be made to follow a path of movement that can be described as a rectangle or square, two sections of this path of movement being parallel to the surface of the bath of molten glass. The other two sections of the path of movement between them are perpendicular to the surface of the melt, so that the pusher is lowered vertically onto the surface of the molten bath and raised away from it again vertically. In this manner an extremely uniform and equal division of the material stream into so-called material "pads" which are moved along the surface of the bath by the pusher. At the same time the bottom edge of the pusher can be prevented on the one hand from plunging too deep into the molten glass, or on the other hand it can be prevented from being at too great a distance from the bath surface at the beginning and at the end of the pushing movement, so that the action of the pusher at this point is only limited.

On account of the measures taken according to the invention, the pusher holder no longer performs any tilting or rocking movements but only a precisely rectilinear and horizontal movement relative to the platform, so that in this manner the seal in the heat shield can be substantially improved.

An especially advantageous embodiment of the subject matter of the invention in this regard is characterized, according to the further invention, in that, in the heat shield, on either side of the opening for the passage of the charging system through it, two additional slot-like openings are provided for the passage through each of a shaft of the pusher holder, and that each of the vertical slots is provided with a cover plate which is movable together with the platform relative to the heat shield fastened to the stand and movable parallel to the latter, each cover plate being fitted as closely as possible around its shaft.

If this teaching is followed, neither any escape of radiant heat nor of gas or dust particles will be possible in the area of the pusher holder. Nor is such escape possible in the area of the opening for the charging device or on the outside of the charging device. The charging device is sealed against the heat shield by a sleeve. In the interior of the charging device, however, is the charging material which largely blocks the opening in question, so that the thermal radiation can be used advantageously for preheating the material. Dust particles are even largely trapped by the charge material and carried back to the melting furnace, so that their escape to the surroundings is very largely prevented. In this manner the nuisance of dust deposits on the components of the feeding apparatus that are located in back of the heat shield is drastically reduced, but particularly the cleanness of the atmosphere for the operating personnel is perceptibly improved.

It is especially advantageous if the covering plates for the openings in the heat shield are fastened on the platform and have a sliding seal cooperating with each pusher holder shaft at the point where the shaft passes through the shield.

This sliding seal serves not for the mechanical support of the pusher holder, but serves only for sealing purposes, so that its useful life is very long.

It is especially advantageous if the vertical guiding system of the platform consists of four perpendicular guiding columns which are disposed in the stand and on which the platform is guided by bearing cases. The guiding columns can be identical with the columns of the stand, but preferably they are present in addition to the columns of the stand.

Preferred in this case is the arrangement of the additional guiding columns between the bottom frame of the stand and cross members joining two columns of the stand to one another, at about half of the height of the stand.

Pneumatic and hydraulic cylinders as well as spindle drives, crank drives or cam drives can be used as means for driving the horizontal and vertical movement.

Additional advantageous developments of the subject matter of the invention will be found in the rest of the subordinate claims.

The various feature of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

DESCRIPTION OF THE PREFERRED EMBODIMENT

Figure 1:
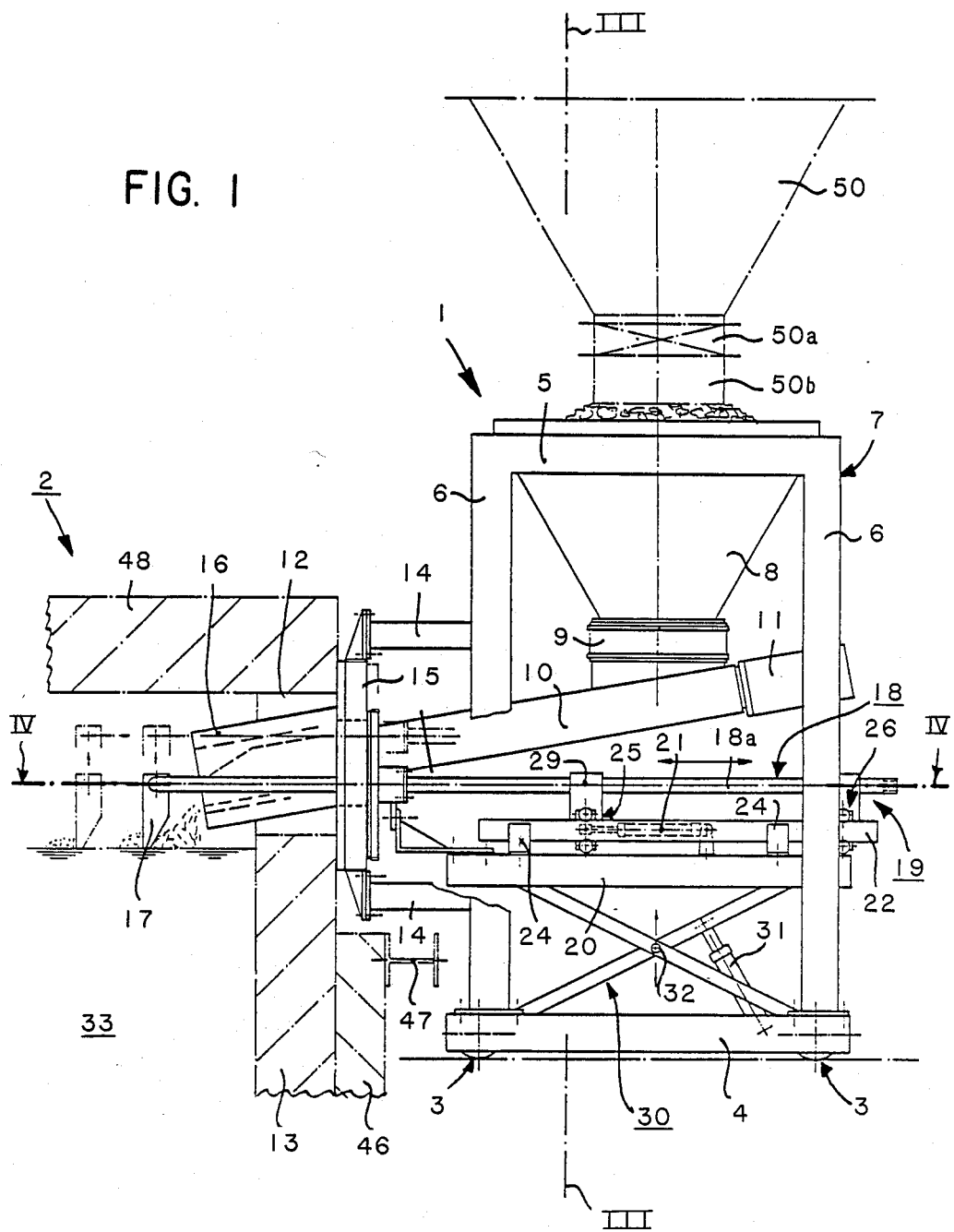
FIG. 1 shows a first embodiment of a feed apparatus working in cooperation with a glass melting furnace

FIG. 1 shows a complete feeding apparatus according to the invention working in cooperation with a glass melting furnace 2. The feeding apparatus includes a lower frame 4 provided with track wheels 3, and an upper frame 5 which is joined to the lower frame by columns 6. The frames 4 and 5 together with columns 6 form a stand 7.

In the upper frame 5 a charge hopper 8 is inserted over which is disposed a bin 50 represented by broken lines with a shutoff 50a and a spout 50b. The charge hopper 8 is in the form of a feeding hopper and is joined by a sleeve 9 to a charge feeder 10 which is in the form of a conveyor trough and provided with a vibratory driver 11. The charge feeder 10 is inclined slightly downward toward a feed opening 12 in a side wall 13 of the glass melting furnace 2. For the purpose of controlling the flow of the materials the vibratory drive 11 is continuously variable.

Figure 4:
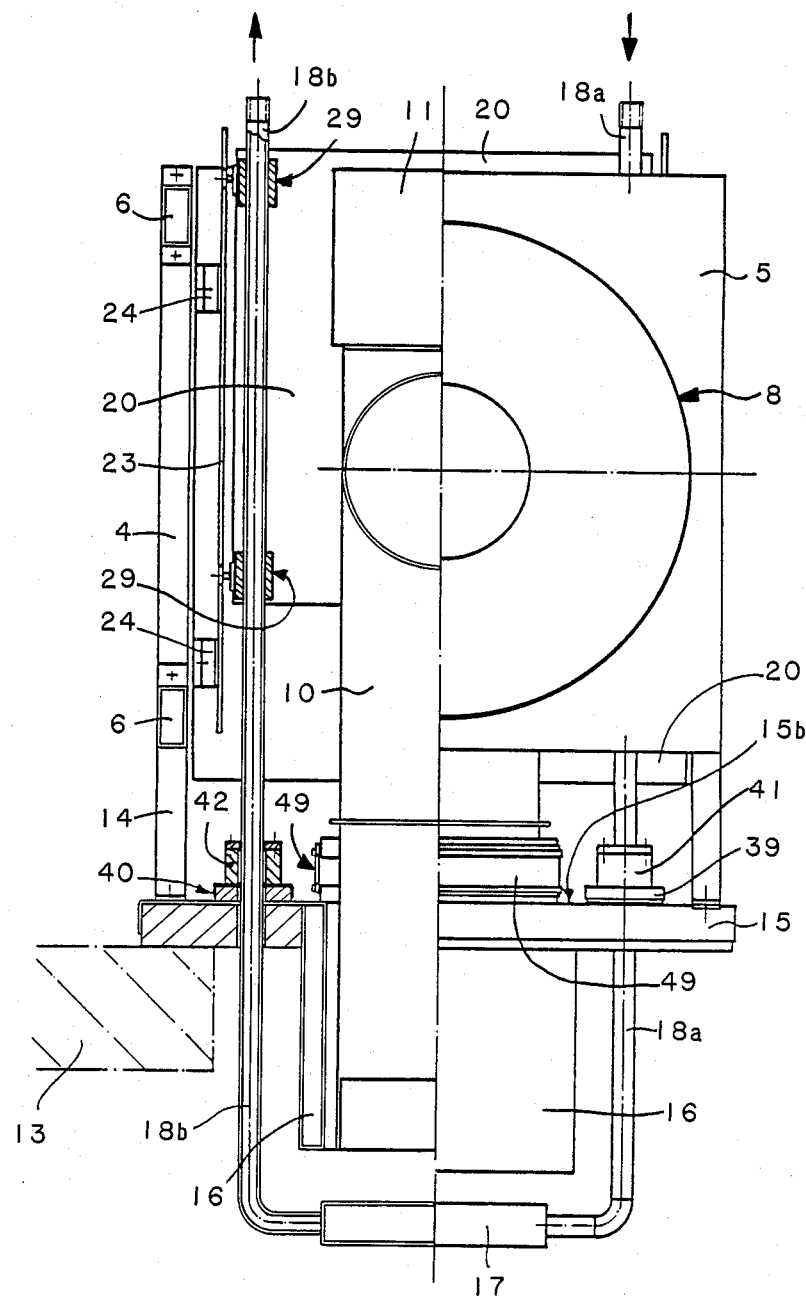
FIG. 4 is a top view and a partial horizontal section along line IV—IV of FIG. 1

On the two front columns 6 facing the glass melting furnace are four beams 14 two of which are concealed from view. A heat shield 15, the details of which are shown in FIG. 4, is fastened to beam 14. On heat shield 15 there is fastened a box-like radiation guard 16 which surrounds the charge feeder 10 on that portion of its length which extends through the heat shield 15 into the interior of the glass melting furnace. Details will likewise be explained with the aid of FIG. 4.

The feeding apparatus 1 furthermore includes a pusher 17 which is fastened to the front end of a pusher holder 18 enabling it to extend into the interior of the glass melting furnace 2. The pusher holder 18 consists of two parallel and horizontally disposed shafts 18a and 18b (FIG. 4), of which only one is visible in FIGS. 1 and 2.

Figure 3:
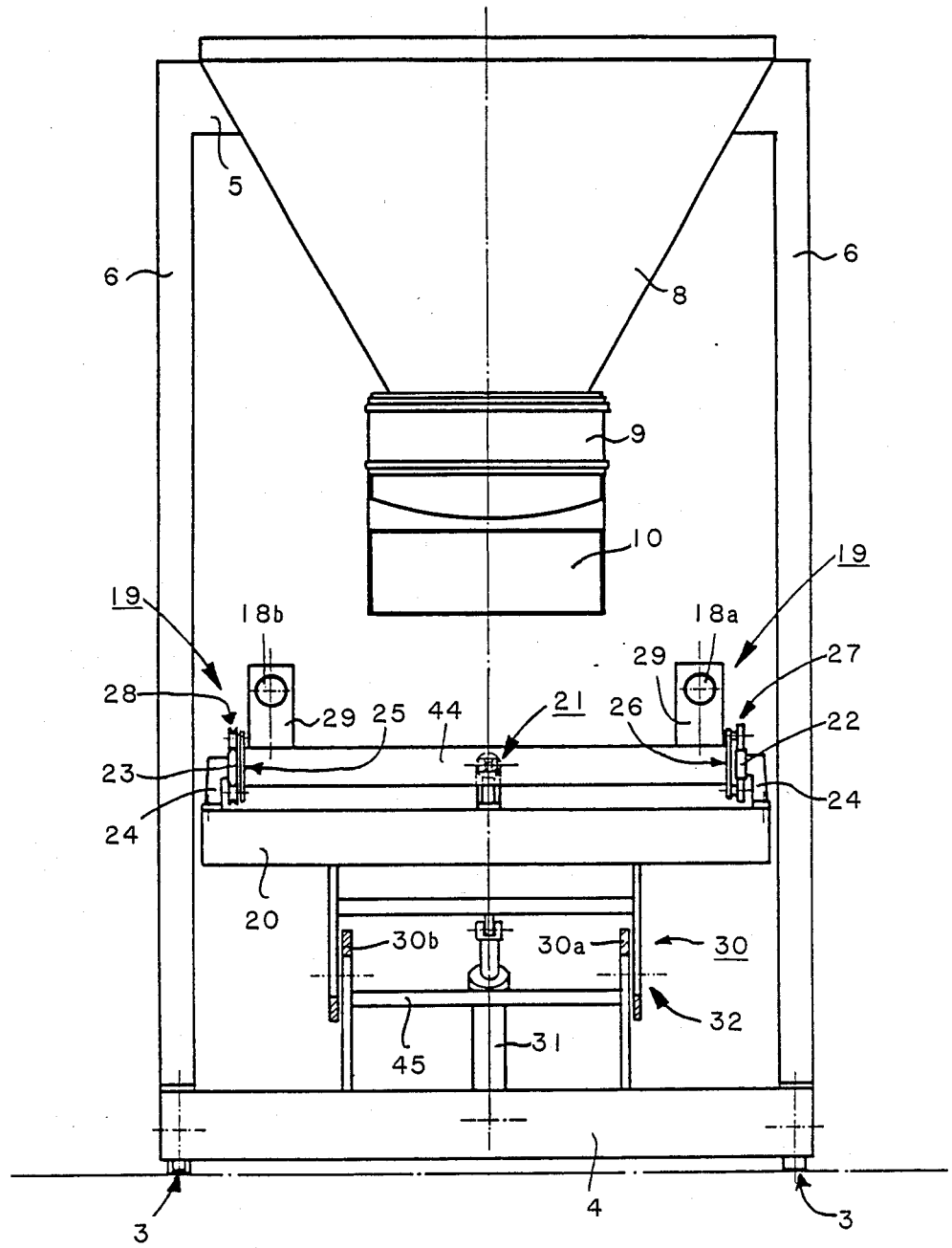
FIG. 3 is a vertical section along line III—III of FIG. 1 with a view of the parts of the apparatus situated behind the plane of the section

The pusher holder 18 is mounted by means of a horizontal linear guiding device 19 on a horizontal platform 20 and is displaceable with respect to the latter by a horizontal driver 21 which will be further explained in conjunction with FIG. 3. The linear guiding device 19 consists of two parallel rails 22 and 23 running toward the heat shield 15 of which, again, only one is visible in FIG. 1, and which are joined to the platform 20 by supports 24, in the manner shown especially in FIG. 3. Wheel holders 25 and 26 having each one pair of wheels 27 and 28 bracketing the rails 22 and 23 between them, respectively, can roll on the rails 22 and 23. On account of the cross-sectional shape which can be seen in FIG. 3, the left part of the linear guiding device forms a fixed bearing and the right part of the linear guiding device a loose bearing.

As it can be seen in the figures, the parallel rails 22 and 23 are fastened on the horizontal platform 20 and aligned parallel thereto, and the wheel holders 25 and 26 are in turn fastened to the supports 29 which are affixed to the shafts 18a and 18b of the pusher holder 18. The result is a horizontal linear guiding system for the absolutely horizontal movement, without any appreciable free play, of the pusher 17.

As it can furthermore be seen in FIG. 1, the platform 20 is mounted on the stand 7 by means of a vertical guiding device 30 and can be raised and lowered with respect to the frame by a vertical driver 31. The vertical guiding device 30 is in the form of a scissor linkage whose scissor joint 32 is movable vertically.

A number of additional details will be explained with reference to FIG. 2:

The glass melting furnace 2 is filled with a glass melt 33 which forms a molten bath surface 34 onto which the free-flowing bulk charge material 35 is placed by means of the feeder system 10. Dividing the charge material into so-called "pads" is performed in the manner shown, by means of the pusher 17. The latter is first lowered from the position 17a shown in broken lines to the position shown in solid lines, and from there it is pushed parallel to the molten bath surface 34 to the position 17b represented in broken lines, thereby shifting a portion of the charge material 35 leftward. From this horizontal end position the pusher 17 is raised to the position 17c, also represented in broken lines, and moved back from this position to position 17a. The rectangular pattern of movement is represented in detail by movement arrows. This pattern of movement is achieved by a centrally controlled cooperation of the horizontal linear guiding device 19 and of the vertical guiding device 30 without the need for the pusher holder 18 to perform any tilting or swinging movement.

Figure 5:
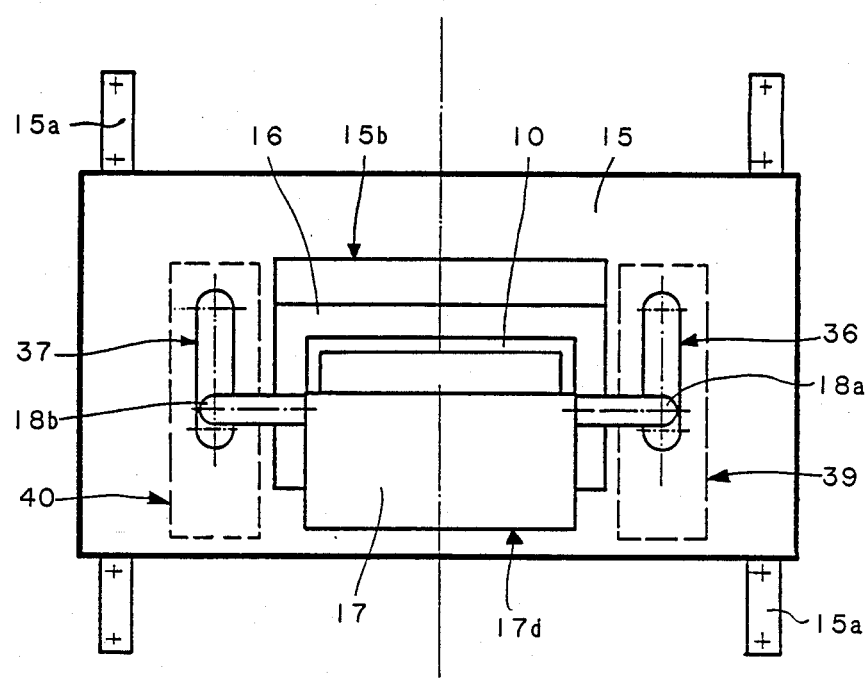
FIG. 5 is a view of the subject of FIG. 2 seen in the direction of the arrow V

The passing of the charging device 10 and the pusher holder 18 through the heat shield 15 is best understood in connection with FIGS. 4 and 5.

The heat shield 15 has an opening 15b for the passage of the charging device 10 on both sides of opening 15b two additional slots 36 and 37 whose longest axes are vertical. These slots serve to accommodate the shafts 18a and 18b of the pusher holder 18 (FIG. 5). As it can be seen especially from FIG. 4, the shafts 18a and 18b are bent at right angles at their front ends and thus lead into the pusher 17 whose bottom edge 17d is aligned with the bath surface 34. The pusher 17 is in the form of an approximately rectangular hollow body (with a beveled bottom) through which a coolant flows which is fed through shafts 18a and 18b.

Each of the two vertical slots 36 and 37 is provided with a cover plate 39 and 40, respectively, whose outlines are represented in broken lines in FIG. 5, since the cover plates are behind the heat shield 15, looking in the direction of radiation. At the same time an overlap has been selected such that the cover plates 39 and 40 block the slots 36 and 37 at least against radiation in every possible position of the pusher 17. Also the size and arrangement of the heat shield 15 are selected such that the latter, in its working position shown in FIGS. 1 and 2, covers the feed opening 12 or closes it as completely as possible. The heat shield 15 is provided with bolting ears 15a with which it is fastened to the beams 14.

The cover plates 39 and 40 have at the point at which the corresponding shafts 18a and 18b pass through them the sliding seals 41 and 42, respectively, whose outer circumferences are joined on the one hand to the corresponding cover plate and on the other hand through a bracket 43 (FIG. 1) to the platform 20. It is apparent that, by means of the slots, the cover plates 39 and 40 are adjustable both horizontally and vertically relative to the platform 20. The cover plates 39 and 40 together with platform 20 can thus be moved relative to the heat shield 15 fastened on the frame 7 and parallel to the heat shield. The sliding seals 41 and 42 are constructed so as to interfere as little as possible with the longitudinal movement of the shafts 18a and 18b.

As it appears from FIG. 4, left half, the cover plates 39 and 40 consist each of a metal base plate and an insulating covering that faces the back 15b of the heat shield 15, and slides on the metal plate on the back of the heat shield 15.

In FIG. 3 it can be seen that the pairs of wheel holders 25 and 26 situated opposite one another in pairs in a mirror-image relationship are joined together by horizontal transverse yokes 44 of which only the front one is seen in FIG. 3. The shafts 18a and 18b are at the same time joined first directly to the yokes 44 by the vertical supports 29 and thus indirectly to the trucks 25 and 26.

With respect to FIG. 3, the direction of movement of the horizontal linear guiding system 19 is perpendicular to the plane of drawing. According to FIG. 3, two parallel scissor joint systems 30a and 30b, connected together by a spacer shaft 45, pertain to the vertical guiding means 30.

It is furthermore apparent from FIGS. 4 and 5 how the box-like radiation guard 16 surrounds the end of the charging system 10 which lies in front of the heat shield 15 in the direction of radiation. Also due to the presence of the radiation guard 16 and of a sleeve 49 disposed between heat shield 15 and charging system 10, the sealing off of the furnace chamber from the space situated behind the heat shield 15 is perceptibly improved. The radiation guard 16 is fixedly joined to the heat shield 15. The bottom end of the charging system 10 (vibratory conveyor) is beveled as indicated by the bent, broken line in FIG. 2. The heat shield 15 consists of a metal plate with a covering of insulating material facing the furnace.

The side wall 13 is one of the boundary walls of a glass melting tank in which molten glasses are produced whose temperature can be between about 1200 and 1450 degrees, depending on the type of glass, and in the case of special glasses, such as borosilicate glass, for example, can be about 1600° C. and higher. The glass melting tank is externally surrounded also by a tank insulation 46 which includes a furnace anchoring 47. The glass melting tank is covered at the top by a protective roof 48.

The radiation guard 16 can be in the form of a double-walled protective tube with metal walls having spaces between them. These spaces can be provided either with thermal insulation materials or with forced air cooling and/or with water connections.

The horizontal driver 21 and vertical driver 31 are in the form of piston-and-cylinder drivers, connected to parts to be moved relative to one another.

Figure 6:
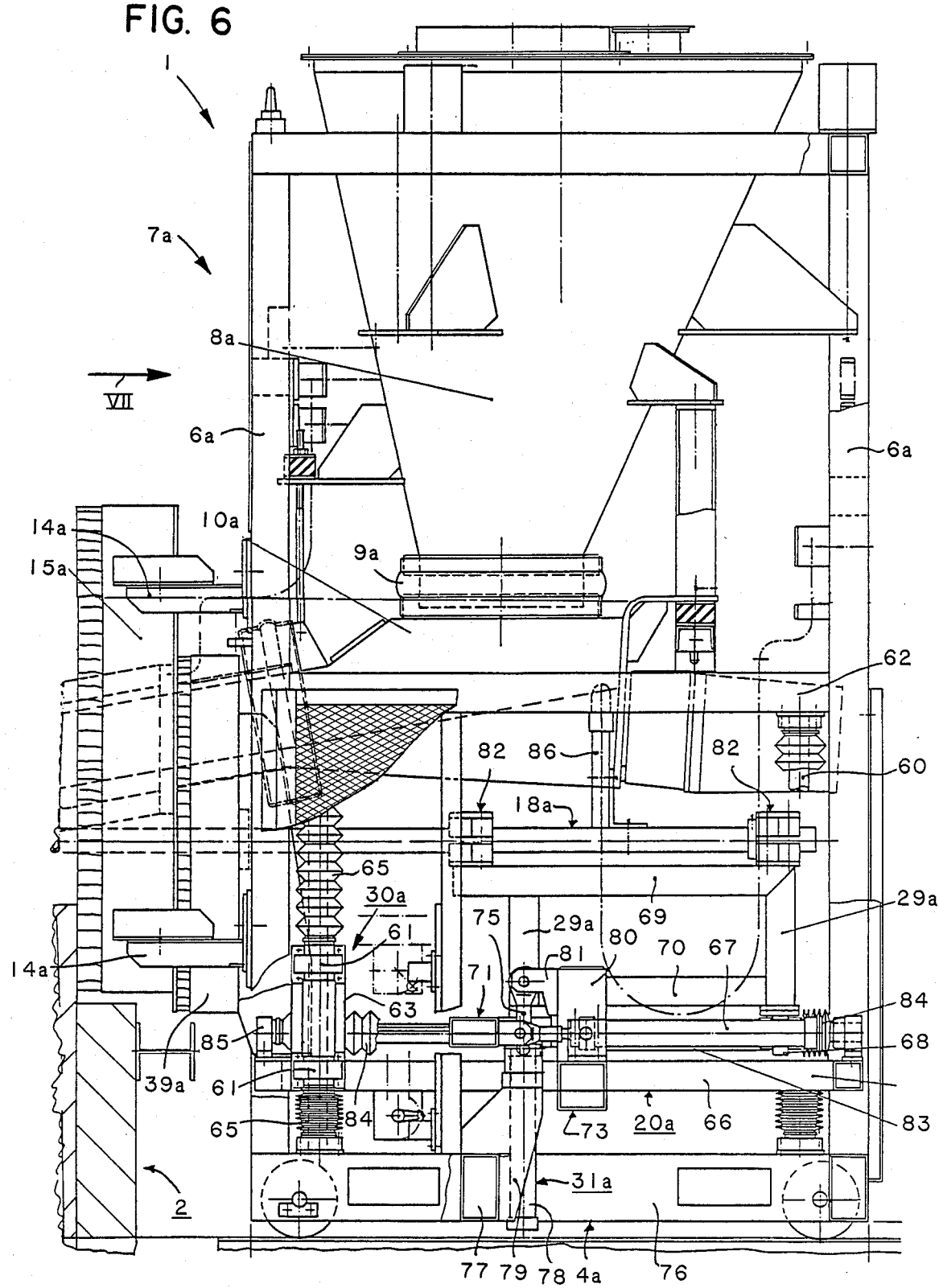
FIG. 6 shows a second embodiment of a feeder in a partially cutaway side view similar to FIG. 1
Figure 8:
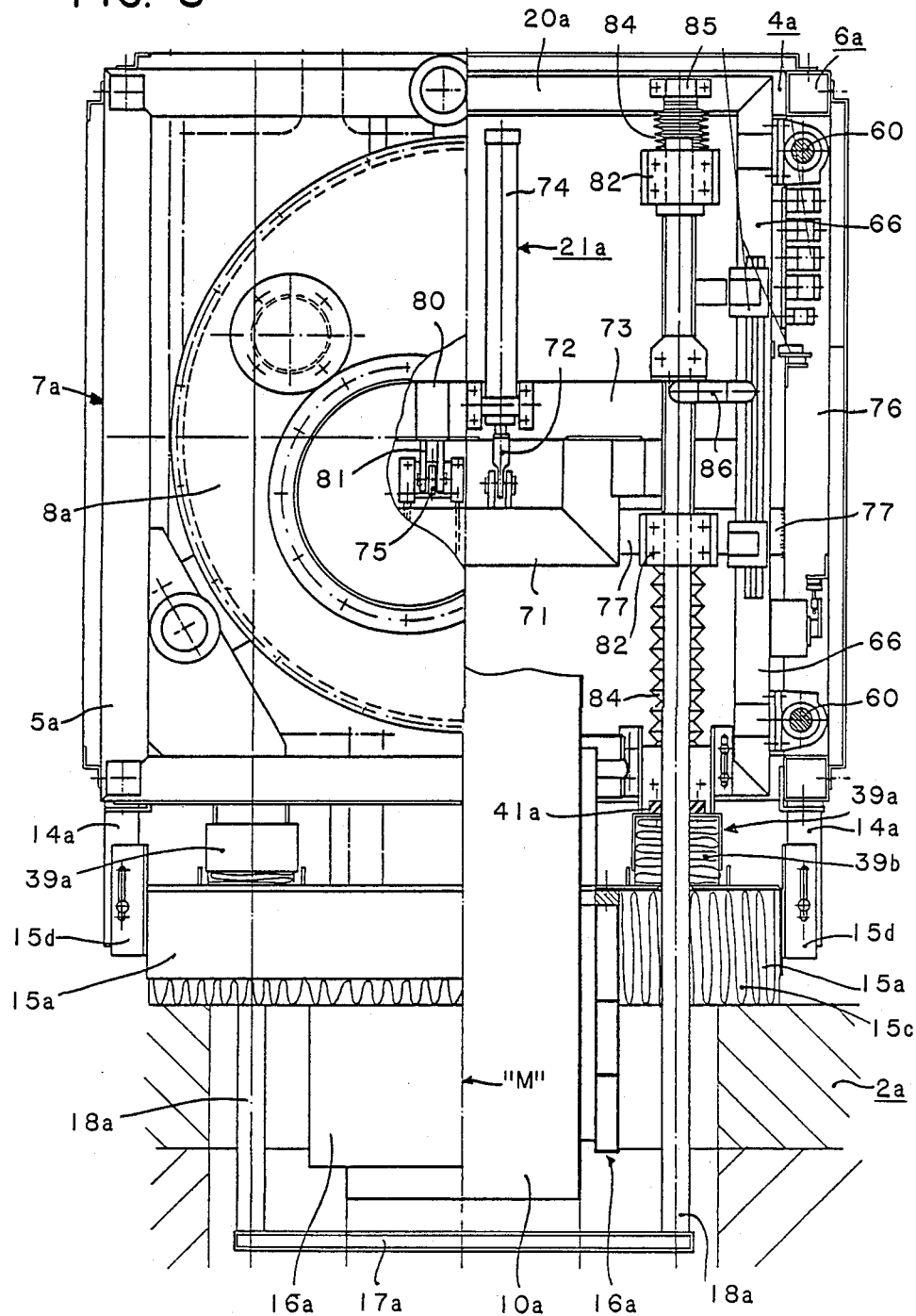
FIG. 8 shows, on the left side of the center line, a top view of the subject of FIG. 6, and on the right side of the center line a horizontal section through the subject of FIG. 6, along a plane in which the shafts of the pusher holder lie.

If in FIGS. 6 and 8 parts are shown which have the same or similar function as those used in FIGS. 1 to 5, the same reference numbers are used, with the addition of the letter "a".

According to FIG. 6, the vertical system 30a for guiding the platform 20a consists of four vertical guiding columns 60 which are disposed in the stand 7a and extend between the lower frame 4a of the stand and the crosspieces 62 each joining together two columns 6a of the stand 7a. The platform 20a is guided on these columns 60 through bearing casing 61.

The vertical guiding columns 60 are at the vertical outside edges of the stand 7a, and two bearing casings 61 are guided on each column 60, being fastened at a distance apart one on each vertical projection 63 fixedly joined to the platform 20a. Between the pairs of bearing casings 61 the vertical guiding columns 60 are surrounded by protective sleeves 64, while they are covered at the ends of the bearing casing facing away from the protective sleeves by bellows 65.

On the members 66 of the platform 20a running at right angles to the glass melting furnace 2, horizontal guiding members 67 are fastened, on which vertical supports 29a for bearing the pusher holder 18a are guided by means of the additional bearing case 68.

The vertical supports 29a are joined together at their upper end by upper crossmembers 69 and at their lower ends by lower crossmembers 70 which run parallel to the guiding members 67. The lower crossmembers 70 are joined together by a transverse yoke 71 which is angled downwardly toward the furnace 2, as can easily be seen in FIGS. 7 and 8. This transverse yoke 71 is engaged by a connecting shaft 72 of a horizontal driver 21a (FIG. 8).

The members 66 of the platform 20a which are disposed perpendicular to the furnace 2 are joined together by an additional transverse yoke 73 on which the cylinder 74 of the horizontal driver 21a is fastened, so that the pusher holder 18a displaceable on the guiding members 67 can be shifted by operating the horizontal driver 21a (FIG. 8).

Figure 7:
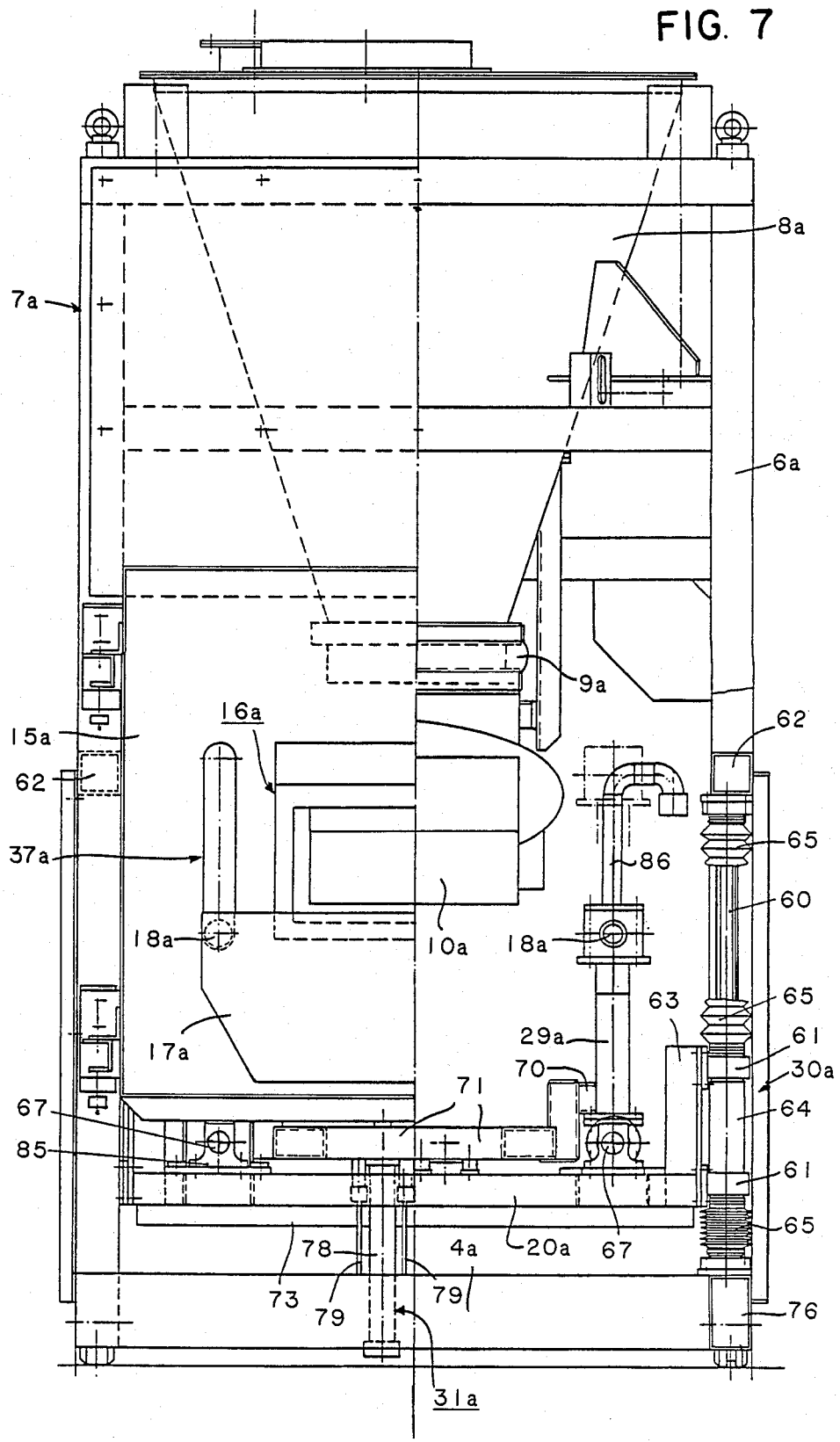
FIG. 7 shows, on the left side of the center line, a front view of the subject of FIG. 6 seen in the direction of the arrow VII, and on the right side of the center line a vertical section through FIG. 6 directly behind the front columns of the frame.

The transverse yoke 73, which, as seen in FIGS. 6 and 7, projects slightly below the platform 20a, is engaged by the connecting shaft 75 of the vertical driver 31a connected to the frame 7a. This is done with the interposition of an upwardly extending projection 80 mounted on the transverse yoke 73, to which is fastened a fork 81 which straddles the upper end of the connecting shaft 75 which is in the form of an eye (FIGS. 6 and 8). This connection is produced by a pin which is not further identified. As it can be seen especially in FIG. 8, the horizontal drive 21a and the vertical drive 31a are disposed on both sides of a center line M which also defines the vertical plane of symmetry of the entire feeding apparatus. By means of this lateral offset any interference of the two drives with one another is prevented.

The two lateral members 76 of the lower frame 4a of the stand 7a are joined together at a point inside of the frame by an additional crosspiece 77 to which the cylinder 78 of the vertical drive 31a is fastened through the brackets 79 which straddle fork-wise the cylinder 78 (FIGS. 6 and 7). In this manner the platform 20a can be raised and lowered vertically with respect to the frame 4a.

The horizontal shafts of the pusher holder 18a are fastened by clamping means 82 on the upper beams 69. Also the horizontal guiding members 67 which have a cylindrical cross section, are protected between the bearing casings 68 by protective sleeves 83, and beyond the bearing casings 68 by bellows 84. The horizontal members 67 are joined at their ends to the platform 20a by means of flanges 85.

With regard to the rest of the details of the apparatus, they are very largely the same as in the embodiment according to FIGS. 1 to 5. For example, here again a charge hopper 8a is suspended in the upper part of the stand 7a and is connected by a sleeve 9a to the charging device 10. The outline of the charging device 10a, which is concealed in the drawing, is indicated by broken lines.

Similarly, a heat shield 15a is fastened on brackets 14a on the stand 7a, its elongated openings 37a (FIG. 7) being covered in a similar manner by cover plates 39a such that the desired vertical movement of the pusher holder 18a is possible without exposing any part of the slots 37a.

In FIGS. 7 and 8 it can also be seen that the shafts of the pusher holder 18a are straight and terminate vertically at their extremities in the pusher 17a which is widened for this purpose. In this manner, gusset plates, not otherwise indicated, can be provided between the pusher holder 18a and the mechanically highly stressed pusher 17a. In FIG. 7 there is shown another of the connecting lines 86 for carrying cooling water for the pusher 17a.

FIG. 8 shows a number of additional details of the sliding seal 41a on the covering plate 39a. It can be seen that the covering plate 39a consists of a box-like metal casing that is open at one end and surrounds a mass of mineral fibers 39b. On the closed end of the metal casing is the above-mentioned sliding seal 41a. The heat shield 15a is also a box-like metal casing open at one end and carries within it a mass of mineral fibers 15c which projects out of the metal casing toward the furnace 2a so as to assure a sealing action. Brackets 15d are situated on opposite sides of the heat shield 15a and are bolted through slots to the cantilevers 14a on the stand 7a so that a horizontal adjustment is possible.

Figure 2:
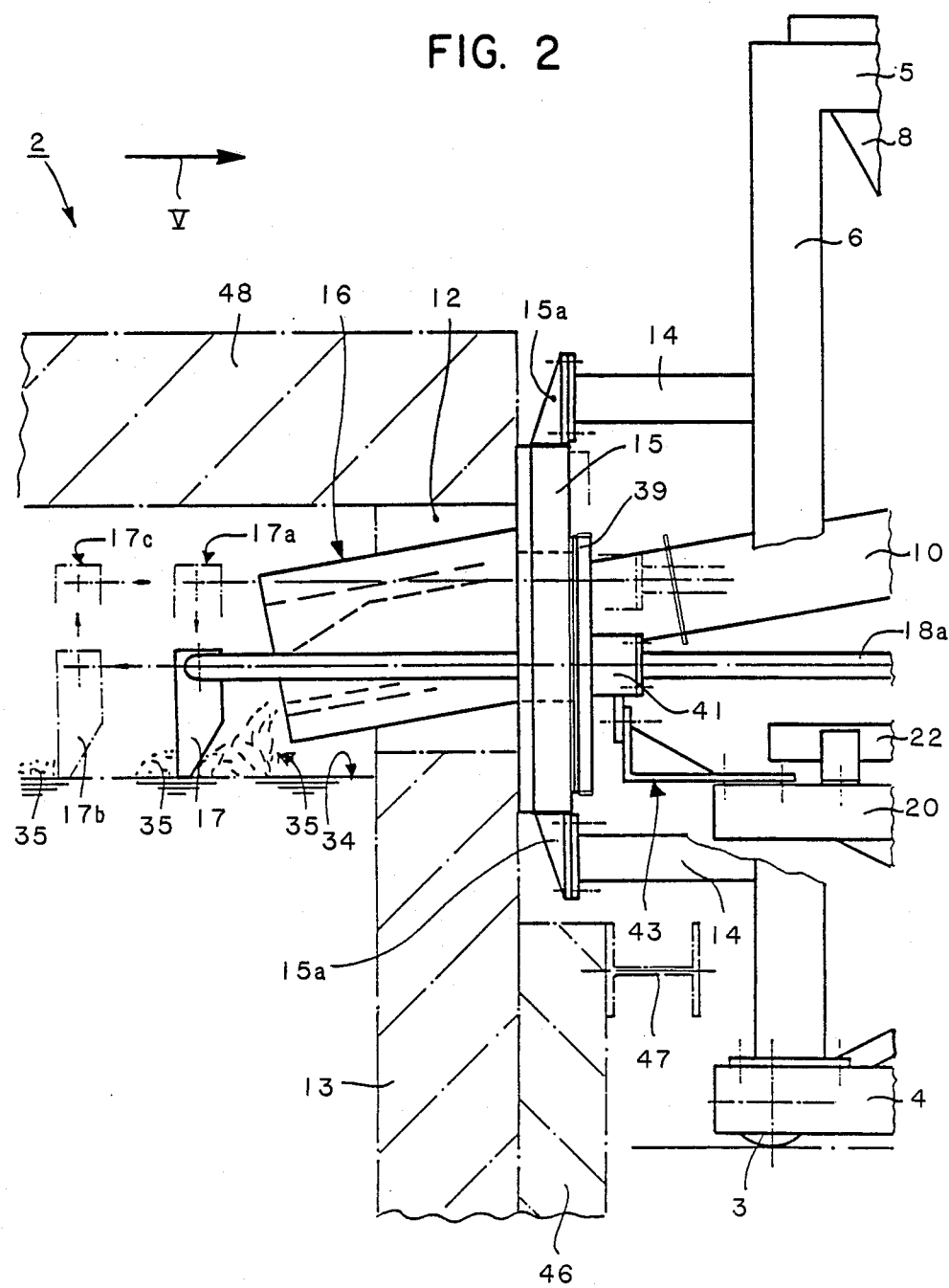
FIG. 2 shows a detail from FIG. 1 on a larger scale

Only half of the upper frame 5a of the frame 7a is here shown (on the left), and the radiation guard 16a for the front end of the charging apparatus 10a is shown only partially, since the geometrical arrangements can easily be understood from FIGS. 1 and 2.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

I claim:

1. A feeding apparatus for feeding and spreading charge material comprising:
    a movable stand;
    a charge hopper supported by the movable stand;
    a charging means;
    a horizontal platform, the platform being mounted for movement parallel to itself on the stand by means of a vertical guiding system;
    drive means to raise and lower said platform;
    a pusher with a pusher holder and pusher driving means adapted to produce a pushing motion with horizontal and vertical components, the pusher holder being mounted by means of a linear guiding device always horizontally aligned on said movable, horizontal platform and being displaceable with respect to the latter by a horizontal driver; and
    a heat shield having at least one slot means provided for the passage of the charging device and of the pusher holder therethrough.

2. The feeding apparatus of claim 1 wherein the horizontal linear guiding device has two parallel rails running toward the heat shield, each of which cooperates with holder means.

3. The feeding apparatus of claim 2 wherein the parallel rails are fastened to the horizontal platform parallel to the later, and the holder means are fastened to two parallel shafts forming the pusher holder.

4. The feeding apparatus of claim 3 wherein in the heat shield, on both sides of an opening for the passage of the charging device, two additional slot-like openings are disposed for the passage each of a shaft of the pusher holder, and that each of the vertical, slot-like openings is provided with a cover plate which is movable together with the platform relative to the heat shield fastened on the stand and parallel to the latter, the cover plate surrounding the corresponding shaft as closely as possible.

5. The feeding apparatus of claim 4 wherein the cover plates are fastened on the platform and each have a sliding seal cooperating with the shaft at the point of penetration of the corresponding shaft.

6. The feeding apparatus of claim 5 wherein the cover plates consist of a metal base plate and an insulating covering facing the back of the heat shield.

7. The feeding apparatus of claim 3 wherein the wheel holders are joined together by horizontal transverse yokes.

8. The feeding apparatus of claim 6 wherein the shafts are connected to the transverse yokes by vertical posts.

9. The feeding apparatus of claim 1 wherein the vertical guiding system for the platform is a scissor-joint system, the scissor joint being movable in the vertical direction.

10. The feeding apparatus of claim 1 wherein the vertical guiding system for the platform consists of four vertical guiding columns which are disposed in the stand and on which the platform is guided by bearing cases.

11. The feeding apparatus of claim 10 wherein the guiding columns extend between the lower frame of the stand and cross members each of which joins together two columns of the frame.

12. The feeding apparatus of claim 10 wherein on each vertical guiding column two bearing cases are carried, which are fastened at a distance apart on a vertical projection joined to the platform.

13. The feeding apparatus of claim 12 wherein the vertical guiding columns between the bearing cases disposed in pairs are surrounded by protective sleeves, while on the ends of the bearing case facing away from the protective sleeves they are surrounded by bellows.

14. The feeding apparatus of claim 10 wherein on the members of the platform which run perpendicular to the glass melting furnace, horizontal guiding members are fastened on which vertical posts for the pusher holders are carried by means of additional bearing cases.

15. The feeding apparatus of claim 14 wherein the vertical posts are connected together at their upper and lower ends by upper and lower cross members, which are parallel to the guiding members, and that the lower cross members are joined together by a transverse yoke which is engaged by the connecting shaft of a horizontal driver joined to the platform.

16. The feeding apparatus of claim 14 wherein at least two members of the platform are joined together by an additional transverse yoke on which the cylinder of the horizontal driver is fastened and which is engaged by the connecting shaft of the vertical driver joined to the stand.

17. The feeding apparatus of claim 14 wherein the two lateral members of the lower frame of the stand are joined together at a point lying within the frame by an additional cross member to which the cylinder of the vertical driver is fastened via brackets.

* * * * *

UNITED STATES PATENT AND TRADEMARK OFFICE
CERTIFICATE OF CORRECTION

PATENT NO. : 4,854,959

DATED : August 8, 1989

INVENTOR(S) : Erich Waltert

It is certified that error appears in the above-identified patent and that said Letters Patent is hereby corrected as shown below:

Column 4, line 64 "furnace" should read --furnace;--.

Column 4, line 65 "scale" should read --scale;--.

Column 4, line 68 "section" should read --section;--.

Column 5, line 2 "1" should read --1;--.

Column 5, line 4 "V" should read --V;--.

Column 5, line 6 "1" should read --1;--.

Column 6, lines 44 to 45 "15b two" should read --15b are two;--.

Column 10, line 10 "later" should read --latter--.

Signed and Sealed this

Twelfth Day of November, 1991

*Attest:*

HARRY F. MANBECK, JR.

*Attesting Officer*       *Commissioner of Patents and Trademarks*